United States Patent [19]
Loomans et al.

[11] Patent Number: 5,017,269
[45] Date of Patent: * May 21, 1991

[54] METHOD OF CONTINUOUSLY CARBONIZING PRIMARILY ORGANIC WASTE MATERIAL

[75] Inventors: Bernard A. Loomans; James E. Kowalczyk, both of Saginaw; Harold A. Lange, Freeland; Jerry W. Jones, Bay City, all of Mich.

[73] Assignee: APV Chemical Machinery Inc., Saginaw, Mich.

[*] Notice: The portion of the term of this patent subsequent to Mar. 13, 2007 has been disclaimed.

[21] Appl. No.: 438,099

[22] Filed: Nov. 20, 1989

Related U.S. Application Data

[63] Continuation-in-part of Ser. No. 291,131, Dec. 28, 1988, Pat. No. 4,908,104.

[51] Int. Cl.⁵ .................... C10B 53/02; C10B 57/14
[52] U.S. Cl. ........................ 201/25; 201/33; 201/35; 201/44; 202/117
[58] Field of Search ............ 201/8, 25, 32, 33, 35, 201/44, 41; 202/117, 118; 585/240–242; 264/29.1, 29.7, 211.21, 211.23, 349; 44/605, 606; 432/1, 121

[56] References Cited

U.S. PATENT DOCUMENTS

| | | | |
|---|---|---|---|
| 3,195,868 | 7/1965 | Loomans et al. | 366/85 |
| 3,387,826 | 6/1968 | Loomans | 366/77 |
| 3,719,350 | 3/1973 | Loomans | 366/75 |
| 3,787,292 | 1/1974 | Keappler | 202/118 |
| 4,098,649 | 7/1978 | Redker | 201/25 |
| 4,106,997 | 8/1978 | Kevorkian et al. | 201/32 |
| 4,123,332 | 10/1978 | Rotter | 201/15 |
| 4,126,519 | 11/1978 | Murray | 201/32 |
| 4,210,491 | 7/1980 | Schulman | 201/25 |
| 4,217,175 | 8/1980 | Reilly | 202/118 |
| 4,235,676 | 11/1980 | Chambers | 202/118 |
| 4,247,367 | 1/1981 | Reilly | 202/105 |
| 4,261,795 | 4/1981 | Reilly | 202/118 |
| 4,304,609 | 12/1981 | Morris | 202/118 |
| 4,308,103 | 12/1981 | Rotter | 202/117 |
| 4,344,770 | 8/1982 | Capener et al. | 201/2.5 |
| 4,345,988 | 8/1982 | Koch | 202/118 |
| 4,353,713 | 10/1982 | Cheng | 48/209 |
| 4,412,889 | 11/1983 | Oeck | 202/117 |
| 4,463,203 | 7/1984 | Gi | 585/241 |
| 4,483,257 | 11/1984 | den Otter | 202/228 |
| 4,501,644 | 2/1985 | Thomas | 202/99 |
| 4,568,425 | 2/1986 | Putnam et al. | 202/118 |
| 4,584,060 | 4/1986 | Winckler et al. | 201/32 |
| 4,686,008 | 8/1987 | Gibson | 202/118 |
| 4,705,603 | 11/1987 | McMullen et al. | 202/118 |
| 4,712,992 | 12/1987 | Kim | 264/211.23 |
| 4,744,669 | 5/1988 | Kowalczyk et al. | 366/77 |
| 4,752,135 | 6/1988 | Loomans | 366/85 |
| 4,759,300 | 7/1988 | Hansen et al. | 201/25 |
| 4,826,323 | 5/1989 | Loomans | 366/85 |

FOREIGN PATENT DOCUMENTS 0294226 12/1988 European Pat. Off. .

Primary Examiner—Joye L. Woodard
Attorney, Agent, or Firm—Learman & McCulloch

[57] ABSTRACT

A method of continuously carbonizing a mixture of primarily organic waste material wherein a stream of comminuted waste material with a substantial organic material content is fed to one end of a mixer barrel, the material is compressed to form a barrel filling mass functioning as a first vapor block, and the work energy required to compress it and squeeze out entrapped air is used virtually exclusively to maintain the temperature of the material adiabatically, air and any steam created are vented, the material downstream from the first vapor block is decompressed in a second vent region, the material is recompressed in the absence of air to form another vapor block, while exclusively utilizing the work energy required to compress it to maintain the temperature of the material adiabatically at volatile releasing and carbonizing temperatures, the volatiles are vented, and the product is discharged as a dry, friable particulate char.

23 Claims, 5 Drawing Sheets

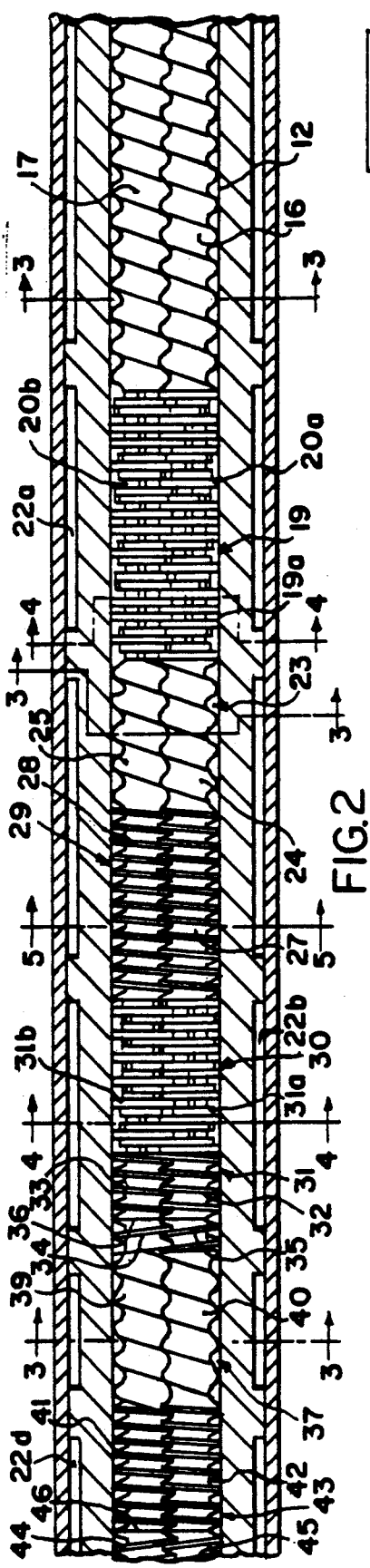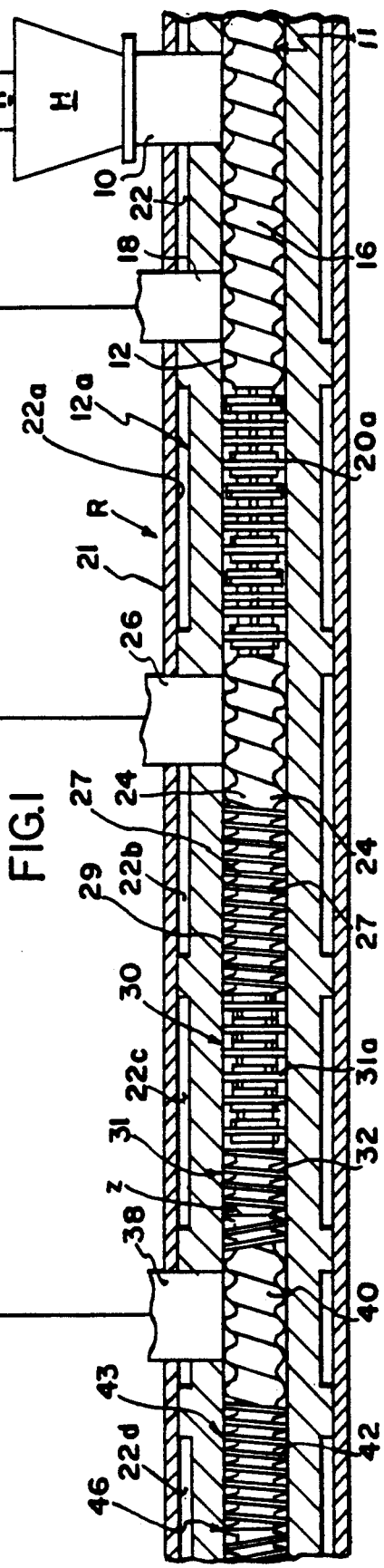

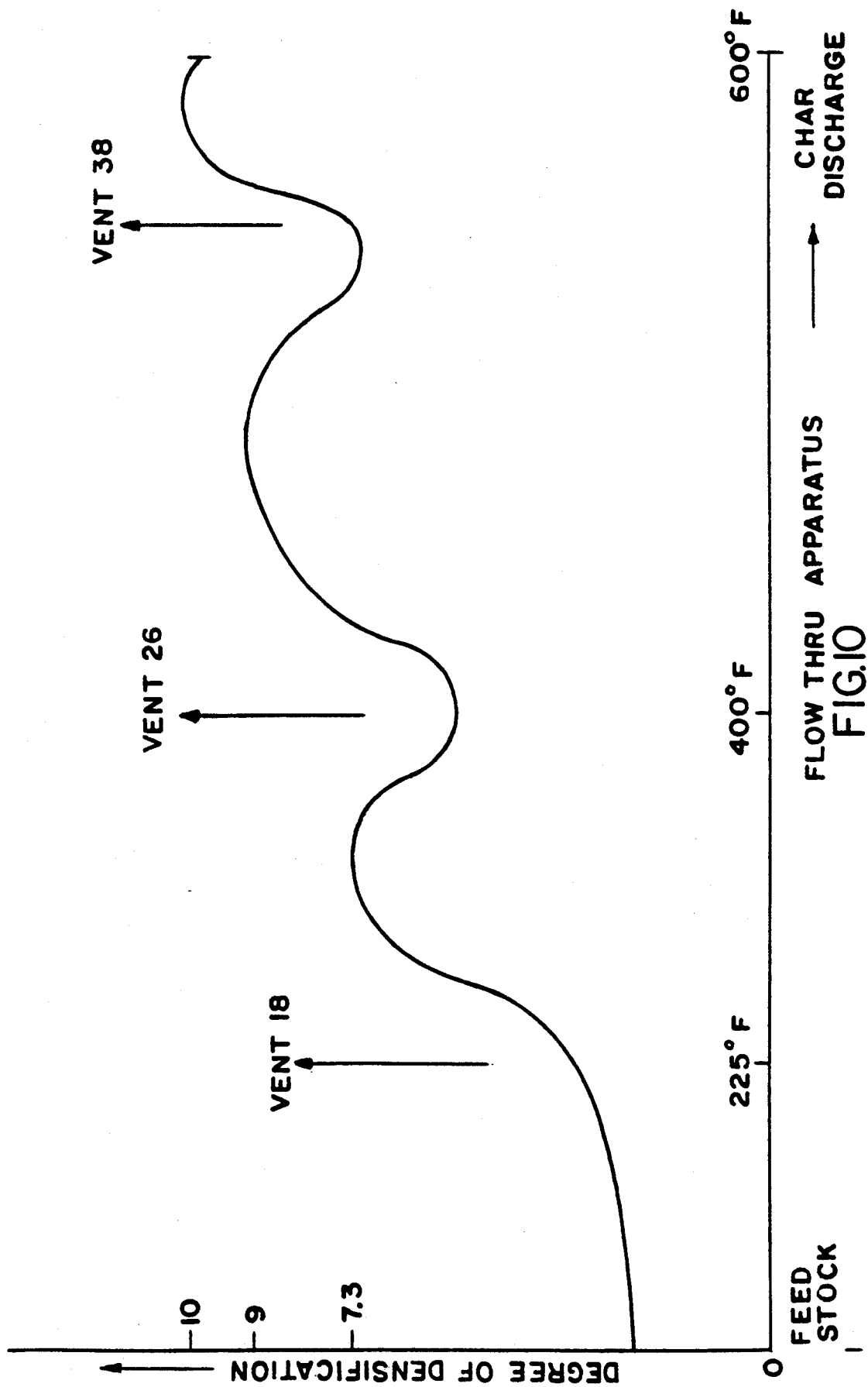

METHOD OF CONTINUOUSLY CARBONIZING PRIMARILY ORGANIC WASTE MATERIAL

The present application is a continuation-in-part of application Ser. No. 291,131, filed Dec. 28, 1988, now U.S. Pat. No. 4,908,104.

BACKGROUND OF THE INVENTION

The present invention is concerned with an improved method of destructively distilling comminuted organic waste materials and reducing them to a useful char product.

The method to be disclosed involves certain novel, useful and unobvious improvements in processes which have been proposed for converting organic waste material to a char material, such as the processes disclosed in U.S. Pat. Nos. 4,098,649; 4,123,332; and 4,308,103. The conversion of industrial and municipal waste by incinerating it in conventional incinerators and/or burying it in landfill areas is no longer viable for the future. The conventional incineration of the material releases fumes and smoke to the atmosphere which are objectionable, and cause pollution problems. Moreover, presently practiced incineration is expensive and does not result in the recovery of any useful products which can offset the cost of incineration. The burying of waste in landfill areas is also unsatisfactory in this society in view of the tremendous volumes of waste which are generated nationwide, and the scarcity of landfill areas which, afterward are no longer useful for most other purposes.

Prior art methods, such as the method disclosed in U.S. Pat. No. 4,098,649, have initially separated the trash into organic and inorganic materials. Principally, this division of the trash or refuse has resulted in the separation of the metals and glass, from organic materials such as paper, wood, rags, plastic, fabric, and vegetable matter.

It is the organic material which is treated in the process described in U.S. Pat. No. 4,098,649, and with which the present invention is concerned. As in the process described in U.S. Pat. No. 4,098,649, the organic material is initially shredded into small particles, and then passes through a drying station from which it is fed to a mixer-reactor for further processing of the material.

SUMMARY OF THE INVENTION

The present invention utilizes a twin screw mixer or reactor which receives the material at one end, and discharges it as a char at the other. During the processing, lighter volatiles are vented at one point, and may be usefully combusted or further processed to separate them and reduce them to useful products. Heavier volatiles are vented from another region downstream, and may also be usefully combusted or separated, and then further processed to provide useful products.

In the present method, the twin screw mixer-reactor which is very satisfactorily employed comprises a pair of co-rotating axially extending shafts, with substantially co-wiping material advancing elements thereon, which also substantially wipe the interior of the barrel. Rather than seeking to apply external heat to the barrel, according to the method practiced in the prior systems to which reference is made, the work energy imparted to the material during the advancing and compression of the material which is necessary to the process, is utilized to raise the temperature of the material adiabatically. In so processing the material, tremendous cost savings are, of course, possible, and waste disposal is immediately rendered more economically viable. Essentially the process is controlled by the mixer or agitator element geometry which determines energy input, and we have determined that smaller processing reactors can be used to produce larger volumes of char than previously.

The present method further involves processing the municipal waste material, for example, at much lower temperatures than previously, so that the char material discharged includes a greater optimum percentage of the heavier hydrocarbons which increase the BTU output of the char when it is later usefully combusted in a plant such as a coal-fired power plant.

One of the prime objects of the present invention is to provide a method of converting organic waste materials to useful materials wherein the materials and heat energy salvaged can, in considerable part, pay for the costs of disposal, without creating pollution and landfill problems.

Another object of the invention is to provide a process in which the pyrolyzing of the material in the reactor is better controlled, cylindering of the material in the mixer is avoided, and the low-bulk density material being processed is more positively advanced as a moving stream with the result that the product obtained is a more homogenous product.

Still another object of the invention when municipal waste is processed is to provide a final product which has a higher BTU value than previously has been obtained, and which discharges as a dry friable product which does not agglomerate, and can be more easily handled and utilized when mixed with coal particles.

Another object of the invention is to provide a continuous process which can very efficiently process a large volume of material in a manner to create economy of scale efficiencies and obtain maximum benefits from the disposal of hitherto unwanted refuse material.

Other objects and advantages of the invention will be pointed out specifically or will become apparent from the following description when it is considered in conjunction with the appended claims and the accompanying drawings.

IN THE DRAWINGS

FIG. 1 is a partially schematic, side sectional elevational view, illustrating the reactor in which the material is processed;

FIG. 2 is a sectional, top plan view of the reactor illustrated in FIG. 1;

FIG. 10 is a densification graph illustrating how the material is compressed and decompressed in its passage through the reactor.

DETAILED DESCRIPTION OF THE INVENTION

Figure 6:
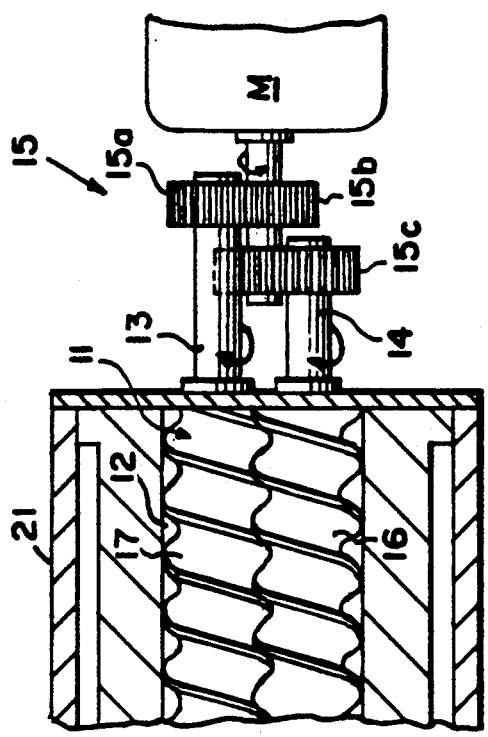
FIG. 6 is a fragmentary, sectional, plan view on an enlarged scale of the charge end of the reactor.
Figure 7:
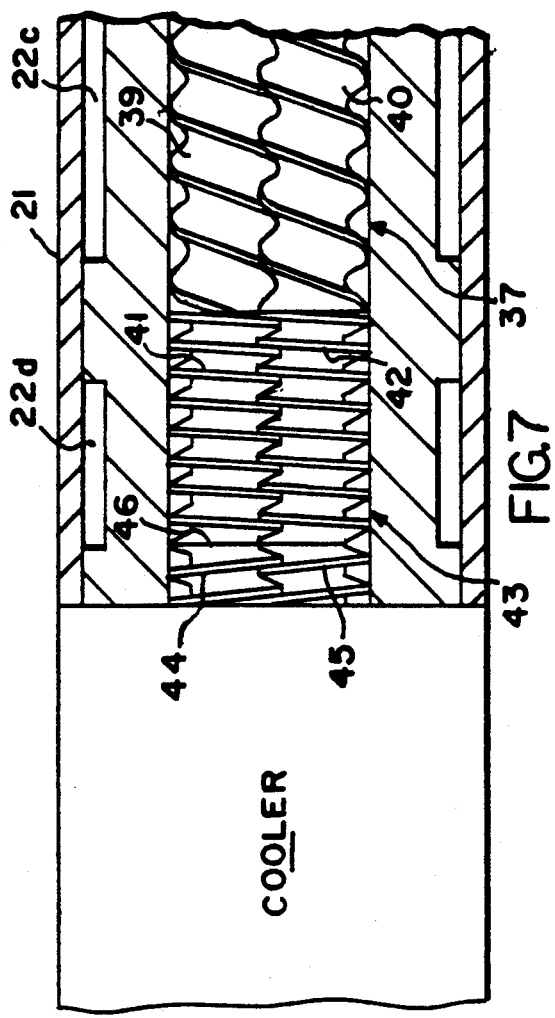
FIG. 7 is a fragmentary, sectional, plan view of the discharge end of the reactor.

Referring now more particularly to the accompanying drawings, and in the first instance particularly to FIG. 1, it is to be understood that the refuse which is to be carbonized will first have been processed to remove metal and glass. It will, in other words, consist essentially of organic material and, in the case of municipal waste, have a relatively high paper content with relation to the other organic material which typically comprises garbage, wood and plastic material. The waste material then will be shredded, ground and dried, and will enter the mixer-reactor generally designated R, via a feed port 10, communicating with a hopper H supplied by a horizontally disposed, power-driven screw feed element 11, which positively feeds the material into the figure 8-shaped barrel chamber 12 (see FIGS. 3 and 4) at a predetermined rate. The waste material being fed typically will enter the reactor in pieces up to 1½ inches in diameter and in the case of municipal waste have a plastic content on the order of 4-8 percent by weight dependent on the degree to which the material is presorted prior to being fed. The rate of feed of the material by screw 11, will be such as to maintain the barrel chamber 12 partially filled with the material as the material proceeds in a continuous stream from the feed port end of the machine to the discharge end of the machine, traveling from right to left in FIGS. 1 and 2.

Generally speaking, in tests which were conducted with municipal waste, it was found that the material had relatively good flow properties, and, in order to process it at suitable commercial rates, it was necessary to compress the relatively fluffy material and work it against itself in order to impart the work energy required to heat it to the desired temperatures.

As the figures indicate, the axially extending barrel chamber 12 provided in the barrel, generally designated 12a, houses a pair of co-rotating shafts 13 and 14, driven from a motor, generally designated M, through a gear system, generally designated 15, which includes gears which are more or less schematically indicated at 15a, 15b, and 15c, for driving the shafts in the same direction and at the same speed of rotation.

Figure 5:
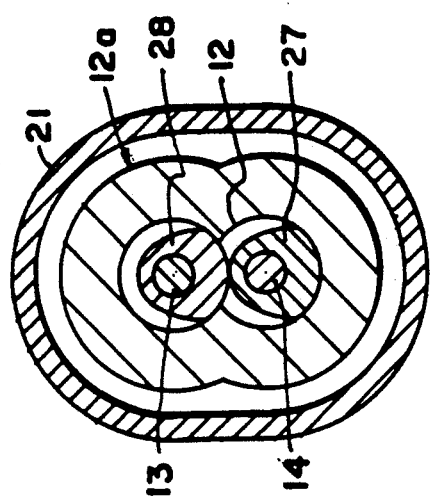
FIG. 5 is a transverse, sectional view taken on the line 5—5 of FIG. 1

As will become apparent, the mixing and forwarding elements which are provided on the shafts from one end of the reactor R to the other, are of both screw and paddle form, and have differing configurations in different zones of the reactor chamber 12 to perform designated tasks. Throughout the reactor R, both the screws and paddles are of the co-wiping character illustrated in FIGS. 3, 4, and 5, so that, as the material proceeds from one end of the reactor to the other, the radial surfaces of the screws and paddles are completely co-wiped, as are the entire interior surfaces of the figure 8-shaped barrel 12. The particular screw and paddle cross-sectional configurations which have been illustrated are preferred, and work very satisfactorily in the practice of the method involved in the present invention. It is believed that other paddle shapes are also possible, however, such as paddles of generally triangular, or tri-lobe type.

Figure 3:
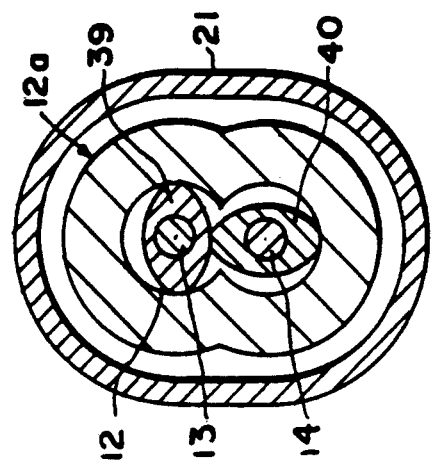
FIG. 3 is a transverse, sectional view through the twin screws, taken on any of the lines 3—3 of FIG. 1.

Fixed on the shafts 13 and 14 at the charge, or feed, end of the reactor R, are the helical advancing screw sections 16 and 17 which are of the lenticular cross-section illustrated in FIG. 3. These sections 16 and 17 extend slightly beyond a first barrel vent 18, which, principally, removes steam from the reactor. While the material charged will have been predried, it typically will have a low residual moisture content in the range of 8 to 9 percent.

Further, while it is desired that carbonization in the reactor occurs as near as possible in the absence of oxygen, inevitably, there is a minor amount of air entrapped or entrained in the product which is also released at vent 18. While not shown, if desired, a pipe could lead into the barrel 12 at the charge end of the reactor R to flood the product with nitrogen gas, as an oxidation control agent.

Figure 4:
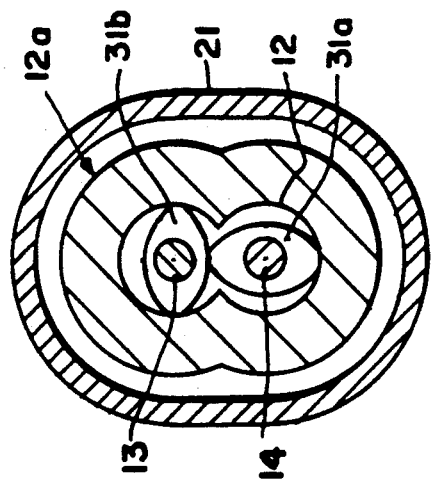
FIG. 4 is a transverse, sectional view of the self wiping paddles employed in certain regions, taken on any of the lines 4—4 of FIG. 1.
Figure 8:
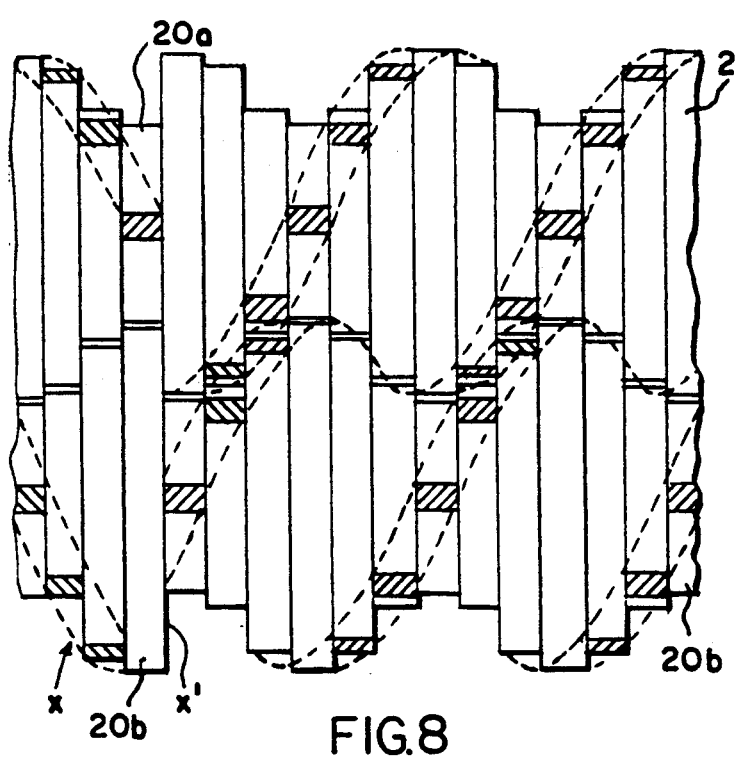
FIG. 8 is an enlarged side elevational view schematically illustrating the manner in which the paddle elements are arranged in helical formation on each shaft in several regions of the reactor.
Figure 9:
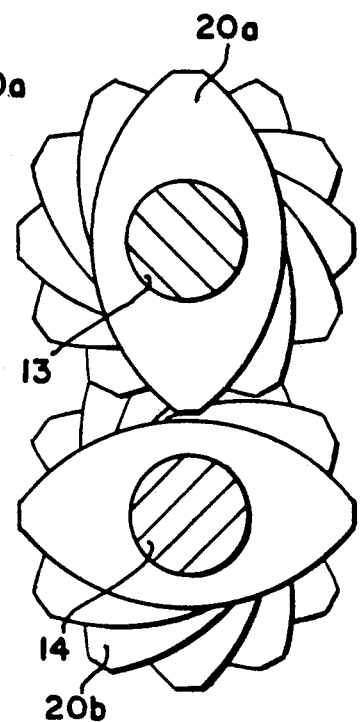
FIG. 9 is an end elevational view of the elements illustrated in FIG. 8.

Immediately downstream from the advancing screw sections 16 and 17, is a first material chopping and compressing region, generally designated 19, in which lenticular paddles 20a and 20b, of the same configuration as the paddles 31a and 31b disclosed in FIG. 4, are disposed on the respective shafts in 90° out of phase relationship. These radially abutting paddles 20a and 20b, which are fixed on shafts 14 and 13, respectively, are progressively axially angularly out of phase or offset on each shaft, with the axially adjacent paddles on each shaft arranged in helical formation. The paddles 20a and 20b in the upstream and middle portions of region 19 are arranged in a helical array which moves the greater proportion of material forwardly in a downstream direction. The material is moved by drag flow, with some of the material being moved in a direction to work against the material being moved forwardly. This material working action of the paddles 20a and 20b is enhanced at the discharge end of region 19 by arranging the several paddles 20a and 20b in the downstream end of region 19 in reverse helical formation on each shaft 13 and 14 as shown in FIG. 8 at x so that the greater proportion of material in this part of the reactor tends to be directed rearwardly or reversely. Of course, the far greater number of paddles 20a and 20b tend to force the material forwardly so the net effect is forward movement of the mass. In FIG. 8, where the paddle lobes are shaded for purposes of illustrating the helical formation and in FIG. 9, the paddles 20 and 20b are shown in more detail and it will be observed that the interface of the paddles of forwarding hand and of reversing hand is at x'. While the paddles 20a and 20b are shown as disposed in helical, product-moving formation, it should be understood they could also or alternatively, each be helically configured for product-moving purposes. While the successive paddles 20a and 20b are shown as 30 degrees out of phase on each shaft 13 and 14 in FIGS. 8 and 9 for purposes of better illustrating the helical formation, it is to be understood they more normally would be 45 or 60 degrees out of phase in their helical formation.

The function of paddles 20a and 20b in region 19, is to so compress the charged material as to form a vapor block at the downstream end of region 19, in the area 19a, and to also chop, or further shred, the material to further reduce it in particle size. In view of the formation of the barrel-filling, compressed moving mass of material in the downstream end of region 19, steam, and any small amounts of air which are released, flow countercurrently in an upstream or reverse direction to vent 18. These vapors may be found useful in a heat exchanger, generally designated HE, which can be used to provide heat for useful purposes, either for an industrial process in which heat is required, for heating a building, or for some like function.

The region 19 may be aptly described as a product-steaming region in which the product is further dried and steam is driven off, but substantially no pyrolysis of the charged material occurs. The temperature attained, via work energy inputted to the material by paddle sections 20a and 20b, will be in the neighborhood of 225° F. at vent 18, and in the neighborhood of 400° F. at the discharge end of region 19.

The temperature rise in the charged material, commencing with the ambient temperature at which the material is charged to the machine, to the temperature of 400° F., which is reached at the downstream end 19a of region 19, is virtually solely a function of the work energy imparted to the material by working it via the paddles 20a and 20b, and is reached gradually, or progressively in region 19. The jacket 21, which surrounds the barrel 12a and provides a plurality of surrounding chambers 22, 22a, 22b, 22c, and 22d, is filled with a heat transfer fluid which, in effect, only warms the metal and imparts no heat to the material being processed. The metal warming heating fluids in chamber 22 are recirculating fluids, which are expediently utilized at start-up, when no material is being processed, to warm the metal initially to the equilibrium temperature of the process, so that the metal does not remove heat from the charge during processing. This barrel warming heat could also be electrically applied to the barrel.

Immediately downstream from region 19, is a first decompression zone, generally designated 23. In this region the helical advancing screw sections 24 and 25 fixed on shafts 13 and 14, are of the same pitch and lenticular cross-section as screw sections 16 and 17. The screw sections 24 and 25 accordingly are configured for a lower degree of fill than region 19a and the material is permitted to relax sufficiently so that it does not flow out a second vent 26. In this respect, the screw sections 24 and 25 are like the screw sections 16 and 17, in the sense that the pressure within the barrel 12 at these vents is not such as to force solid material out the vents. While considered unnecessary, once the machine is in operation, suction pumps or fans may be connected with any of the vents which are used in the system to aid process start-up, or even to aid the withdrawal of vaporous or off-gas material, should that be deemed desirable.

The vent 26 is a vent which egresses light volatiles which are released downstream from region 19, and the vent 26 can lead to and supply a suitable condensor when there is a reason to trap these volatiles and separate useful products from them, or may lead to a burner for combusting them. Downstream from region 23, and fixed on shafts 13 and 14, are helical screw sections 27 and 28 of the single lead or lobe configuration disclosed in FIG. 5, which have such a pitch, relative to the pitch of screw sections 24 and 25, as to commence to recompress the material. The region 29 of the barrel, occupied by screw sections 27 and 28 functions as an initial recompression zone, and leads to a region 30 in which paddle sections 31a and 31b, of the same lenticular configuration and helical formation as paddles 20a and 20b, further chop and reduce the material while further compressing and densifying it. The paddles 31a and 31b are arranged identically to the illustration of paddles 20a and 20b in FIGS. 8 and 9. Here again, far more paddles 31a and 31b are arranged helically to forward the flow, than to reverse it in the downstream end of region 30, where the forwarding and reversing paddles confront at an interface z, and the net flow is forward. In regions 23 and 29, the charged fluffy material has begun to toast, and further toasts in region 30, such that, by the time it reaches the adjacent downstream region 31, it has taken on a dark brown color. The color of the material proceeding from region 23 in a downstream direction gradually changes from tan to the dark brown color it assumes at the discharge end of region 30, where a temperature in the neighborhood of 450° F. has been reached.

In region 31, single lobe screw sections 32 and 33, identical to the helical sections 27 and 28, are fixed on shafts 13 and 14 at the upstream end of region 31. Single lobe, screw sections 34 and 35 of exactly the same configuration, but of reverse hand, are fixed on shafts 13 and 14 at the downstream end of region 31, confronting the forwarding screw sections 32 and 33 at the interface z. The screw sections 34 and 35 function with the screw sections 32 and 33 to work the material against itself and provide a significantly increased work input of heat to the material. The material proceeding through regions 29, 30 and 31 is, during the process of pyrolyzing, being greatly reduced in volume and particle size, so that, at least at region 36, near the interface z between the screw sections 34 and 35, and 32 and 33, a vapor block of compressed material, which fills the barrel 12, is provided. The lighter volatiles which are released in regions 29, 30 and 31, thus proceed countercurrently in a rearward or upstream direction to be vented at vent 26.

Downstream from the region 31, is a second decompression region 37, from which a vent 38 extends. In this region 37, advancing screw sections 39 and 40, which are fixed on shafts 13 and 14 and are of the same configuration as the screw sections 24, 25 and 16, 17, are of such pitch as to permit decompression of the material at vent 38. Vent 38 is a heavy volatiles vent, and may lead to a suitable condenser which permits separation and recovery of the useful, heavy vapors. Alternatively, these vapors may be efficiently combusted to furnish the requisite heat for an industrial process or the like.

Downstream from region 37, where temperatures have reached a temperature in the neighborhood of 575°-600° F., single lobe, decompressing, forwarding screw sections 41 and 42, of the same configuration as screws 27 and 28, are fixed on shafts 13 and 14 in a region generally designated 43, and function with identically configured single lobe screw sections of opposite hand 44 and 45 fixed on the shafts 13 and 14, to recompress the material, and form a third vapor block at interface 46 which forces the heavy volatiles being given off in this region and region 37 to proceed countercurrently in a reverse or upstream direction to vent 38. At the vapor block area 46, the temperature has been raised to a temperature in the neighborhood of 600° F., and final charring of the material occurs. The product in screw sections 39 and 40, has taken on a dark brown/black cast, whereas in the region 43, the material is completely black and has a charcoal-like appearance.

The material from region 43 extrudes directly into a conventional energy recovery cooler which cools the char below auto-ignition temperature, before releasing it to atmosphere. Typically, the cooler may comprise a barrel housing a hollow forwarding screw through which a circulating cooling fluid is passed. Such a heated recirculating cooling fluid may be further used, of course, to furnish heat for a useful purpose.

Figure 11:
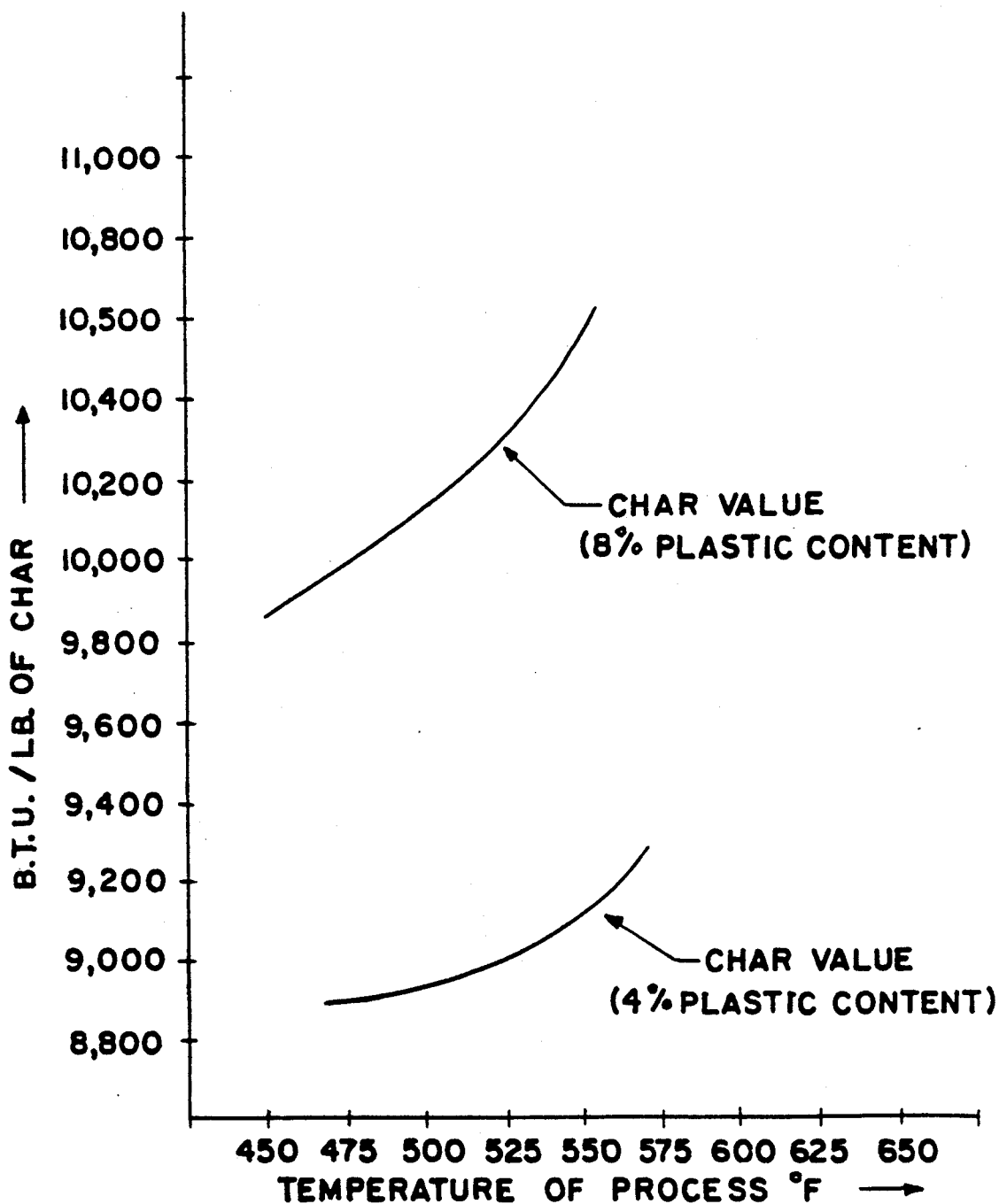
FIG. 11 is a graph which portrays the temperature ranges at which the present process produces a useful char from municipal waste.

During its passage through the reactor R, the waste material charged will have been reduced approximately 50–60 percent in weight and will have been greatly reduced in volume also. In the reactor, it is necessary that ever higher degrees of densification be achieved as the temperature increases and the pyrolyzation progressively proceeds. FIG. 10 discloses the densification curve which occurs in the process on a scale of 0–10 to illustrate relative densification where the value of 10 indicates the extruding densification at discharge. The product is released from the cooler to atmosphere as a dry, friable particulate which, in the case of pyrolized municipal waste can be utilized, without further processing, as a coal additive in a utility power plant, for instance. Such an additive may be used in a mixture fed to the utility company burner in a ratio by weight of coal to additive in the range of 90 percent pulverized coal to 10 percent char produced by the present system. The char product released by the present system will, as indicated, be friable, and will not tend to agglomerate due to the presence of sticky, heavy tars, or the like, on the surfaces of the char particles. By pyrolyzing the material gradually, and raising its temperature gradually to a final temperature in the range 550° F. to 600° F., a char product is obtained which retains certain organic materials in a chemically combined state such that the char provides a higher BTU content, when burned, than previously. The pyrolized municipal waste char product produced by the present lower temperature process typically provides BTU per pound values much like a high grade coal where the product provided by previous processes produced BTU ratings similar to low grade coal. Combustibility, also, is considerably enhanced in the present product. In FIG. 11, a graph is provided which illustrates the values provided.

The waste from a steel remelt facility handling automobile bodies can, after separation of the metal and glass ingredients, also be converted using the present process. Typically, after the automobiles are shredded, magnetic separators are utilized to remove steel and other magnetic alloys, and the aluminum, copper, and glass are also preseparated from the shredded material. The remaining material typically is, in large part, of synthetic plastic content, but may include some cellulosic material such as paper, wood, and natural fibre fabrics. Typically, the plastic material will include foamed cellular material which may be thermoplastic or thermosetting in character, synthetic textile material, and rigid molding and panel material. Certain vehicles may, of course, have virtually all, or parts, of their bodies formed of synthetic plastic material.

Such organic industrial waste materials can be fed through the mixer reactor disclosed in FIGS. 1–9 of the drawings under essentially the same process conditions as the municipal waste material. Insofar as FIG. 10 of the drawings is concerned, the curve depicted will be typical, although the temperatures may vary somewhat because of the higher plastic content of the waste. The dry, uniform black char material which is obtained as a result of the pyrolysis is roughly a quarter inch in maximum size and has a higher ash content. Its enhanced per pound product heating value is accordingly lower, roughly 5000 BTU's per pound. It is believed such a char product needs to be mixed with fuels having a significantly higher BTU value in order to recover any heating value from the char. The char is, however, useful otherwise, for instance, as a substantially inert filler in concrete plants, because of its very high ash content.

As previously, the first pyrolizer vent 18 produces steam-air vapor, the second vent 26 produces a light organic vapor, and the third vent 38 produces a small quantity of darker, more liquid vapor. The char discharges from the mixer at a temperature typically in the range 536° to 600° F. At vent 38 the temperature of the material typically may be in the range 500° to 557° F., whereas at vent 26 its temperature may be typically in the range 400° to 530° F. At vent 18 its typical temperature range may be 225° to 500° F. In tests which were conducted the process operated successfully, and only was terminated when a piece of metal entered the pyrolizer with the material feed, and jammed the pyrolizer internals.

While only several embodiments of the invention have been described in detail, it will be apparent to those skilled in the art that the disclosure process may be modified. Therefore, the foregoing description in all aspects is to be considered exemplary rather than limiting in any way, and the true scope of the invention is that defined in the following claims.

What is claimed is:

1. A method of continuously carbonizing a mixture of waste material from vehicles which are being junked to recycle the metallic material which consists in large proportion of shredded synthetic plastic material, and reducing the mixture to a useful char product comprising the steps of:

a. continuously feeding a stream of the shredded waste material into one end of a twin screw mixer having an axially extending, elongate barrel, with a barrel chamber of uniform size figure-eight cross section from said one end to the other end, and housing a pair of co-rotating axially extending shafts;

b. progressively compressing the material fed into said one end of the mixer by advancing the material continuously through co-rotating mixing and material conveying elements on said shafts which leave a reduced volume of space in the uniform size barrel for the material to the extent of forming a barrel-filling mass of moving material functioning as a first vapor block, and utilizing the work energy imparted to the material required to compress the material to squeeze out entrapped air, and without applying any material external heat to the mixer for transfer to the material, to maintain the temperature of the material adiabatically;

c. venting air at a first vent region upstream from said first vapor block;

d. continuing to advance the material in a downstream direction from said first vapor block by advancing the material through co-rotating mixing and material conveying elements on said shafts and decompressing the material in a second vent region, having a vent, to provide a traveling mass of material which does not so fill the barrel as to be forced out the vent in said second vent region;

e. progressively recompressing the material in the absence of air in a first recompression region by passing the material through co-rotating mixing and material conveying elements on said shafts which leave a relatively reduced volume of space in the uniform size barrel for the material to the extent of forming a mass of moving material filling the barrel and functioning as a second vapor block, while utilizing the work energy required to recompress the material, without applying any material external heat to the mixer for transfer to the material, to maintain the temperature of the material adiabatically at lighter volatile vaporizing temperatures;

f. venting lighter volatiles from said second vent region;

g. continuing to advance the material by advancing it through co-rotating mixing and material conveying elements on said shafts and decompressing the material in a third vent region, having a vent, to provide a traveling mass of material which does not so fill the barrel as to be forced out the vent in said third vent region;

h. progressively again advancing and recompressing the material in the absence of air in a second recompression region by passing the material through co-rotating mixing and material conveying elements on said shafts which leave a relatively reduced volume of space in the uniform size barrel for the material to the extent of forming a mass of moving material filling the barrel and functioning as a third vapor block, while utilizing the work energy required to recompress the material, without applying any material external heat to the mixer for transfer to the moving material, to maintain the temperature of the material adiabatically at material carbonizing and heavier volatile releasing temperatures in the neighborhood of the range 450° F.–600° F.;

i. venting heavier volatiles from said third vent region; and j. discharging a friable particulate char from the other end of the mixer.

2. The method of claim 1 in which said char is passed through a cooler to lower its temperature below an auto-ignition temperature.

3. The method of claim 1 in which said mixing and material conveying elements for compressing the material to squeeze out the air and form said first block are bi-lobe elements of substantially lenticular configuration.

4. The method of claim 3 in which said mixing and material conveying elements for recompressing the material to form said mass of moving material functioning as a second block are bi-lobe elements of substantially lenticular configuration.

5. The method of claim 1 in which said mixing and material conveying elements recompressing the material to form said mass of moving material functioning as a third block are single lobe elements.

6. The method of claim 1 wherein at said first vent region the temperature of the material is in the range 225°–500° F.

7. The method of claim 6 wherein at said second vent region the temperature of the material is in the range 500°–530° F.

8. The method of claim 1 wherein at said second recompression region the temperature of the material is at a level in the neighborhood of 500° F.

9. The method of claim 1 wherein at said third vent region the temperature of the material is at a level in the neighborhood of 500°–590° F.

10. The method of claim 1 wherein in said first and second recompression regions, said mixing and material conveying elements move material countercurrently to work against material being moved by said mixing and material conveying elements in a downstream direction.

11. The method of claim 1 wherein at said first vapor block said mixing and material conveying elements move material countercurrently to work against material being advanced by said mixing and material conveying elements in a downstream direction, to aid compression and create work energy.

12. The method of claim 1 wherein said mixing and material conveying elements in step b include elements arranged in opposing helical formation on said shafts to provide a net forwarding and compressing pressure on said material.

13. A method of continuously carbonizing a mixture of shredded waste material which includes a large proportion of synthetic plastic material, and reducing the mixture to a useful char product comprising the steps of:

a. continuously feeding a stream of the comminuted waste material into one end of a continuous mixer having an axially extending elongate barrel, housing axially extending mixer shafts;

b. progressively compressing the material fed into said one end of the mixer by advancing the material continuously through material conveying and compressing elements on the shafts which leave a reduced volume of space in the barrel for the material to the extent of forming a moving barrel-filling mass of material functioning as a first vapor block in a first region of said barrel, and utilizing the work energy imparted to the material required to squeeze out entrapped air in the material to maintain the temperature of the material;

c. venting air squeezed out from said first region in a first vent zone upstream from the first vapor block;

d. continuing to advance the material downstream from said first vapor block in a further downstream vent zone having a vent by advancing it through mixing and material conveying elements on said shafts which decompress the material to provide a traveling mass which does not so fill the barrel as to be forced out the vent;

e. progressively compressing the material downstream from said further vent zone in the substantial absence of air in a further downstream region by passing it through material conveying and compressing elements on said shafts which leave a relatively reduced volume of space in the barrel for the material to the extent of forming a mass of moving material filling the barrel and functioning as another vapor block, while working the material against itself to create heat in the material which maintains the temperature of the material adiabatically at volatile releasing and material carbonizing temperature without applying any material external heat to the mixer for transfer to the moving material;

f. venting volatiles from said vent in said further vent zone;

g. and discharging the carbonized material from said further downstream region.

14. A higher BTU per pound friable char produced by continuously carbonizing a mixture of primarily organic shredded waste material from vehicles which are being junked to recycle the metal, and which consists in large proportion of synthetic plastic material, and reducing the mixture to a char product, wherein the steps followed are:

a. continuously feeding a stream of the shredded waste material into one end of a twin screw mixer having an axially extending, elongate barrel, with a barrel chamber of uniform size figure-eight cross section from said one end to the other end, and housing a pair of co-rotating axially extending shafts;

b. progressively compressing the material fed into said one end of the mixer by advancing the material continuously through co-rotating mixing and material conveying elements on said shafts which leave a reduced volume of space in the uniform size barrel for the material to the extent of forming a barrel-filling mass of moving material functioning as a first vapor block, and utilizing the work energy imparted to the material required to compress the material to squeeze out entrapped air, and without applying any material external heat to the mixer for transfer to the material, to maintain the temperature of the material adiabatically;

c. venting air at a first vent region upstream from said first vapor block;

d. continuing to advance the material in a downstream direction from said first vapor block by advancing the material through co-rotating mixing and material conveying elements on said shafts and decompressing the material in a second vent region, having a vent, to provide a traveling mass of material which does not so fill the barrel as to be forced out the vent in said second vent region;

e. progressively recompressing the material in the absence of air in a first recompression region by passing the material through co-rotating mixing and material conveying elements on said shafts which leave a relatively reduced volume of space in the uniform size barrel for the material to the extent of forming a mass of moving material filling the barrel and functioning as a second vapor block, while utilizing the work energy required to recompress the material, without applying any material external heat to the mixer for transfer to the material, to maintain the temperature of the material adiabatically at lighter volatile vaporizing temperatures;

f. venting lighter volatiles from said second vent region;

g. continuing to advance the material by advancing it through co-rotating mixing and material conveying elements on said shafts and decompressing the material in a third vent region, having a vent, to provide a traveling mass of material which does not so fill the barrel as to be forced out the vent in said third vent region;

h. progressively again advancing and recompressing the material in the absence of air in a second recompression region by passing the material through co-rotating mixing and material conveying elements on said shafts which leave a relatively reduced volume of space in the uniform size barrel for the material to the extent of forming a mass of moving material filling the barrel and functioning as a third vapor block, while utilizing the work energy required to recompress the material, without applying any material external heat to the mixer for transfer to the moving material, to maintain the temperature of the material adiabatically at material carbonizing and heavier volatile releasing temperatures in the range 450° F.–600° F.;

i. venting heavier volatiles from said third vent region; and j. discharging a friable particulate char from the other end of the mixer.

15. A higher BTU per pound char produced by continuously carbonizing a mixture of primarily organic shredded waste material which principally includes synthetic plastic material, and reducing it to said char product wherein the steps followed are:

a. continuously feeding a stream of the comminuted waste material with a substantial organic materials content, into one end of a continuous mixer having an axially extending elongate barrel, housing axially extending mixer shafts;

b. progressively compressing the material fed into said one end of the mixer by advancing the material continuously through material conveying and compressing elements on the shafts which leave a reduced volume of space in the barrel for the material to the extent of forming a moving barrel-filling mass of material functioning as a first vapor block in a first region of said barrel, and utilizing the work energy imparted to the material required to squeeze out entrapped air in the material to maintain the temperature of the material;

c. venting air squeezed out from said first region in a first vent zone upstream of the first vapor block;

d. continuing to advance the material downstream from said first vapor block in a further downstream vent zone having a vent by advancing it through mixing and material conveying elements on said shafts which decompress the material to provide a traveling mass which does not so fill the barrel as to be forced out the vent in said further downstream zone;

e. progressively compressing the material downstream from said further downstream vent zone in the substantial absence of air in a further downstream region by passing it through material conveying and compressing elements on said shafts which leave a relatively reduced volume of space in the barrel for the material to the extent of forming a mass of moving material filling the barrel and functioning as another vapor block, while working the material against itself to create heat in the material which maintains the temperature of the material adiabatically, without applying any material external heat to the mixer for transfer to the moving material, at volatile releasing and material carbonizing temperatures in the range 450° F.–600° F.;

f. venting volatiles from said vent in said further downstream vent zone;

g. and discharging a friable particulate char from said further downstream region.

16. A method of continuously carbonizing a mixture of primarily organic comminuted waste material which includes a considerable proportion of synthetic plastic material, and reducing it to a char product comprising the steps of:

a. continuouly feeding a stream of the comminuted waste material into one end of a continuous mixer having an axially extending elongate barrel, housing axially extending, co-rotating mixer shafts;

b. contacting the material with material advancing elements on said shafts to advance the material fed into said one end of the mixer continuously through a first mixer region;

c. progressively compressing the material in the substantial absence of air in a downstream compressing region by passing it through material conveying and compressing elements on said shafts which leave a relatively reduced volume of space in the barrel for the material to the extent of forming a mass of moving material filling the barrel and functioning as a vapor block, while working the material against itself to create heat in the material which maintains the temperature of the material adiabatically at volatile releasing and material carbonizing temperatures, without applying any material external heat to the mixer for transfer to the moving material;

d. venting volatiles from said downstream region;

e. and discharging the carbonized product from said downstream region.

17. The method of claim 16 in which said char is passed through a cooler to lower its temperature below an auto-ignition temperature.

18. A method of continuously carbonizing a mixture of comminuted primarily organic waste material comprising the steps of:

a. continuouly feeding a stream of the comminuted waste material with a substantial organic materials content, into one end of a continuous mixer having an axially extending elongate barrel, housing axially extending, co-rotating mixer shafts;

b. contacting the material with material advancing elements on said shafts to advance the material fed into said one end of the mixer continuously through a first mixer region;

c. in a downstream mixer region progressively compressing the material in the substantial absence of air by passing it through material conveying and compressing elements on said shafts which leave a relatively reduced volume of space in the barrel for the material to the extent of forming a mass of moving material filling the barrel and functioning as a vapor block, while working the material against itself to create heat in the material which maintains the temperature of the material adiabatically at volatile releasing and material carbonizing temperatures, without applying any material external heat to the mixer for transfer to the moving material;

d. venting volatiles from said downstream region;

e. and discharging the carbonized product.

19. A char produced by continuously carbonizing a mixture of primarily organic shredded waste material and reducing the mixture to a char product, wherein the steps followed are:

a. continuously feeding a stream of the comminuted waste material with a substantial organic materials content, into one end of a continuous mixer having an axially extending elongate barrel, housing axially extending, co-rotating mixer shafts;

b. contacting the material with material advancing elements on said shafts to advance the material fed into said one end of the mixer continuously through a fist mixer region;

c. in a downstream mixer region progressively compressing the material in the substantial absence of air by passing it through material conveying and compressing elements on said shafts which leave a relatively reduced volume of space in the barrel for the material to the extent of forming a mass of moving material filling the barrel and functioning as a vapor block, while working the material against itself to create heat in the material which maintains the temperature of the material adiabatically at volatile releasing and material carbonizing temperature, without applying any material external heat to the mixer for transfer to the moving material;

d. venting volatiles from said downsteam region;

e. and discharging the carbonized product.

20. The method of claim 18 wherein said waste material includes wood material.

21. The method of claim 19 wherein said waste material includes wood material.

22. A method of continuously carbonizing comminuted primarily organic waste material and reducing the mixture to char comprising the steps of:

a. continuously feeding a stream of the shredded waste material into one end of a twin screw mixer having an axially extending, elongate barrel, with a barrel chamber of uniform size figure-eight cross section from said one end to the other end, and housing a pair of co-rotating axially extending shafts;

b. progressively compressing the material fed into said one end of the mixer by advancing the material continuously through co-rotating mixing and material conveying elements on said shafts which leave a reduced volume of space in the uniform size barrel for the material to the extend of forming a barrel-filling mass of moving material functioning as a first vapor block, and utilizing the work energy imparted to the material required to compress the material to squeeze out entrapped air, and without applying any material external heat to the mixer for transfer to the material, to maintain the temperature of the material adiabatically;

c. venting air at a first vent region upstream from said first vapor block;

d. continuing to advance the material in a downstream direction form said first vapor block by advancing the material through co-rotating mixing and material conveying elements on said shafts and decompressing the material in a second vent region, having a vent, to provide a traveling mass of material which does not so fill the barrel as to be forced out the vent in said second vent region;

e. progressively recompressing the material in the absence of air in a first recompression region by passing the material through co-rotating mixing and material conveying elements on said shafts which leave a relatively reduced volume of space in the uniform size barrel for the material to the extend of forming a mass of moving material filling the barrel and functioning as a second vapor block, while utilizing the work energy required to recompress the material, without applying any material external heat to the mixer for transfer to the material, to maintain the temperature of the material adiabatically at lighter volatile vaporizing temperatures;

f. venting lighter volatiles from said second vent region;

g. continuing to advance the material by advancing it through co-rotating mixing and material conveying elements on said shafts and decompressing the material in a third vent region, having a vent, to provide a traveling mass of material which does not so fill the barrel as to be forced out the vent in said third vent region;

h. progressively again advancing and recompressing the material in the absence of air in a second recompression region by passing the material through co-rotating mixing and material conveying elements on said shaft which leave a relatively reduced volume of space in the uniform size barrel for the material to the extent of forming a mass of moving material filling the barrel and functioning as a third vapor block, while utilizing the work energy required to recompress the material, without applying any material external heat to the mixer for transfer to the moving material, to maintain the temperature of the material adiabatically at material carbonizing and heavier volatile releasing temperatures.

i. venting heavier volatiles from said third vent region; and j. discharging the char produced from the mixer.

23. A char produced by continuously carbonizing primarily organic shredded waste material, and reducing the mixture to char, wherein the steps followed are;

a. continuously feeding a stream of the shredded waste material into one end of a twin screw mixer having an axially extending, elongate barrel, with a barrel chamber of uniform size figure-eight cross section form said one end to the other end, and housing a pair of co-rotating axially extending shafts;

b. progressively compressing the material fed into said one end of the mixer by advancing the material continuously through co-rotating mixing and material conveying elements on said shafts which leave a reduced volume of space in the uniform size barrel for the material to the extent of forming a barrel-filling mass of moving material functioning as a first vapor block, and utilizing the work energy imparted to the material required to compress the material to squeeze out entrapped air, and without applying any material external heat to the mixer for transfer to the material, to maintain the temperature of the material adiabatically;

c. venting air at a first vent region upstream from said first vapor block;

d. continuing to advance the material in a downstream direction form said first vapor block by advancing the material through co-rotating mixing and material conveying elements on said shafts and decompressing the material in a second vent region, having a vent, to provide a traveling mass of material which does not so fill the barrel as to be forced out the vent in said second vent region;

e. progressively recompressing the material in the absence of air in a first recompression region by passing the material through co-rotating mixing and material conveying elements on said shafts which leave a relatively reduced volume of space in the uniform size barrel for the material to the extend of forming a mass of moving material filling the barrel and functioning as a second vapor block, while utilizing the work energy required to recompress the material, without applying any material external heat to the mixer for transfer to the material, to maintain the temperature of the material adiabatically at lighter volatile vaporizing temperatures;

f. venting lighter volatiles from said second vent region;

g. continuing to advance the material by advancing it through co-rotating mixing and material conveying elements on said shafts and decompressing the material in a third vent region, having a vent, to provide a traveling mass of material which does not so fill the barrel as to be forced out the vent in said third vent region;

h. progressively again advancing and recompressing the material in the absence of air in a second recompression region by passing the material through co-rotating mixing and material conveying elements on said shafts which leave a relatively reduced volume of space in the uniform size barrel of the material to the extent of forming a mass of moving material filling the barrel and functioning as a third vapor block, while utilizing the work energy required to recompress the material, without applying any material external heat to the mixer for transfer to the moving material, to maintain the temperature of the material adiabatically at material carbonizing and heavier volatile releasing temperatures;

i. venting heavier volatiles from said third vent region; and j. discharging the char produced form the mixer.

* * * * *

UNITED STATES PATENT AND TRADEMARK OFFICE
CERTIFICATE OF CORRECTION

PATENT NO. : 5,017,269

DATED : May 21, 1991

INVENTOR(S) : Bernard A. Loomans, et al

It is certified that error appears in the above-identified patent and that said Letters Patent is hereby corrected as shown below:

Column 8, line 21, change "while" to -- While --.

Column 14, line 31, change "extend" to -- extent --;

line 42, change "form" to -- from --; line 55, change "extend" to -- extent --.

Column 15, line 48, change "form" to -- from --.

Column 16, line 13, change "extend" to -- extent --; line 47, change "form" to -- from --.

Signed and Sealed this

Twenty-ninth Day of September, 1992

Attest:

DOUGLAS B. COMER

*Attesting Officer*     *Acting Commissioner of Patents and Trademarks*